United States Patent Office 3,153,661
Patented Oct. 20, 1964

3,153,661
ORGANOBORON COMPOUNDS AND PROCESS
FOR PREPARATION THEREOF
Gaetano F. D'Alelio, South Bend, Ind., assignor, by direct
and mesne assignments, to Dal Mon Research Co.,
Cleveland, Ohio, a corporation of Delaware
No Drawing. Filed Dec. 14, 1959, Ser. No. 859,089
14 Claims. (Cl. 260—448)

This invention relates to new chemical compositions containing boron, which are particularly useful as high energy fuels. It also relates to methods of preparing such compositions. More specifically, it relates to boron hydrocarbon compounds containing a second metallic atom which is either boron or aluminum.

Alkyl boron compounds have been found desirable for use as liquid fuels for propelling missiles, rockets, etc. In order to have a maximum energy content, the hydrocarbon portion of such compounds should represent as low a proportion as possible of the total weight. However, the presently known alkyl borons having the desired high energy for such purposes are low boiling and have high volatility and toxicity. Attempts to decrease the boiling point and volatility by increasing the size or length of the alkyl groups attached to the boron result in a lower proportion of boron in the compounds and, therefore, a lower energy content.

In accordance with the present invention, new boron-hydrocarbon compounds have been found which have higher boiling points and lower volatility, and thereby reduce the tendency to cause toxicity and eliminate the necessity for use under pressure. These new compounds have a high proportion of metal therein, and, therefore, have as high or even higher energy content that is utilizable for propellant purposes than the presently known alkyl boron compounds. These compounds contain either two atoms of boron therein, or one atom of boron and one atom of aluminum. They are represented by the formula

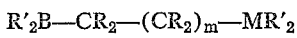

wherein M is boron or aluminum, R is preferably hydrogen but also can be a hydrocarbon group as defined for R' and said R can have on one of said hydrocarbon groups one or more other MR'$_2$ groups, preferably BR'$_2$; R' is a hydrocarbon group of no more than 8 carbon atoms, preferably no more than 3, and $m$ is an integer having a value of at least 1 and no more than 8, preferably no more than 4.

One advantage of boron compounds over aluminum compounds for use in rocket and missile fuels is the lower atomic weight of boron as compared to aluminum. The atomic weight of boron is approximately 11 and that for aluminum is approximately 27. Therefore, for corresponding types of compounds, a given weight of the boron compound will contain a greater number of boron atoms than the number of aluminum atoms contained in a corresponding weight of the aluminum compounds. Thus, in rockets and missiles where the amount of energy derived per unit weight of fuel is very critical and the fuel consists of compounds having high proportions of metal therein, the boron compounds have a decided advantage. In the compounds of this invention where at least two boron atoms are contained in each molecule, this advantage is emphasized even more. In those compounds in which there is one boron atom and one aluminum atom, the higher atomic weight of the aluminum atom is offset to some extent by the fact that there are two metal atoms per molecule, and the ratio of metal to hydrocarbon portions generally compensates for the higher atomic weight of aluminum.

A comparison of trimethyl boron with one of the simplest compounds of this invention, namely 1,2-bis-(dimethyl-boron)-ethane, can illustrate the advantage cited above. The latter compound has an empirical formula of $B_2C_6H_{16}$ and can be regarded as having $C_3H_8$ per boron atom. In comparison, trimethyl boron has an empirical formula of $BC_3H_9$, and and while it has the same number of carbon atoms per boron atom, it actually has one hydrogen atom more per boron atom than the new compound described above. However, trimethyl boron is a gas at room temperature, having a boiling point of $-20°$ C., must be used as a liquefied or compressed gas, and is very toxic. In contrast, the new compound described above is a liquid having a much higher boiling point and relatively low volatility, therefore involving less danger with respect to toxicity.

A simple preferred method for preparing compounds of this invention is the addition of a boron hydride having two hydrocarbon groups attached per boron atom, such as dimethyl boron hydride, to a boron or an aluminum compound having three hydrocarbon groups attached thereto, one of which hydrocarbon groups is an alkenyl group, for example vinyl-dimethyl-boron, or vinyl-dimethyl-aluminum. As an alternate synthesis, the mixed metal type of compound also can be prepared by reacting an aluminum hydride compound having two hydrocarbon groups attached to the boron, two of which hydrocarbon groups have no ethylenic unsaturation and the third hydrocarbon group has an ethylenic group therein.

The above reactions can be represented as follows:

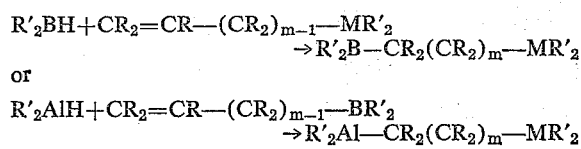

wherein R, R', M, and $m$ are as defined above.

These reactions are catalyzed by an ether compound, such as diethyl ether, tetrahydrofurane, diglyme, etc., as well as boron or aluminum compounds containing hydrocarbon and ether groups therein, such as, for example, (vinyloxy-ethyl)-dimethyl boron, (vinyloxy-ethyl)-diethyl boron, ethyl-bis-(ethoxy-ethyl)-boron, tris-(ethoxy-ethyl)-boron, (vinyloxy-ethyl)-dimethyl aluminum, (vinyloxy-ethyl)-diethyl aluminum, ethyl-bis-(ethoxy-ethyl)-aluminum, tris-(ethoxy-ethyl)-aluminum, etc.

Traces of the ether compounds are sufficient to catalyze reaction markedly. Therefore, the ether is used advantageously in minor amounts and, unless it is also to be used as a solvent or suspension medium, there is no need for more than 5 percent required for catalytic purposes. Also, as catalysts for the reaction of this invention, various compounds of the formula B(OR")$_3$ and Al(OR")$_3$ can be used, in which R" is hydrogen or a monovalent hydrocarbon group of the types indicated above, with at least one R" in each compound being such a hydrocarbon group. Typical examples of such compounds include, trimethyl borate, dimethyl borate, methyl borate, tripropyl borate, dibutyl borate, monoamyl borate, dioctyl borate, monophenyl borate, dibenzyl borate, tricyclohexyl borate, triphenethyl borate, etc., and the corresponding aluminates, such as: triethyl aluminate, propyl aluminate, benzyl aluminate, diphenethyl aluminate, cyclohexyl aluminate, etc.

As discussed more fully hereinafter, the reaction desirably is maintained at such a temperature that the hydride reacts only to the extent that there is hydrogen on the metal atom, and not high enough to replace the hydrocarbon groups thereon. While the compounds of this invention can be produced to some extent by starting with boron or aluminum compounds having three saturated hydrocarbon groups attached to the metal atom, or more than one hydrogen atom attached to the metal atom, such reactions are more difficult to control and considerable amounts of more highly substituted byproduct materials are produced, generally of a polymeric nature.

Unsaturated compounds that can be used as intermediates in preparing the compounds of this invention can be represented by the formula $$CR_2=CR-(CR_2)_{m-1}-MR'_2$$

wherein R, R', M, and $m$ are as defined above. Typical examples of such compounds include, but are not restricted, to the following:

vinyl-dimethyl-boron,
vinyl-diethyl-boron,
vinyl-dipropyl-boron,
vinyl-dibutyl-boron,
vinyl-diamyl-boron,
vinyl-diphenyl-boron,
vinyl-dicyclohexyl-boron,
vinyl-methyl-ethyl-boron,
vinyl-ethyl-propyl-boron,
vinyl-methyl-phenyl-boron,
vinyl-ethyl-cyclohexyl-boron,
allyl-dimethyl-boron,
allyl-diethyl-boron,
allyl-dipropyl-boron,
allyl-dibutyl-boron,
allyl-ditolyl-boron,
allyl-dicyclopentyl-boron,
isopropenyl-dimethyl-boron,
isopropenyl-diethyl-boron,
isopropenyl-dipropyl-boron,
isopropenyl-dibutyl-boron,
isopropenyl-methyl-ethyl-boron,
isopropenyl-ethyl-propyl-boron,
isopropenyl-dixylyl-boron,
beta-vinyl-triethyl-boron,
(beta-vinyl-ethyl)-dimethyl-boron,
(beta-vinyl-ethyl)-dipropyl-boron,
isobutenyl-dibutyl-boron,
(4-vinyl-cyclohexyl)-dimethyl-boron,
(4-vinyl-n-butyl)-diethyl-boron,
(6-vinyl-n-hexyl)-dimethyl-boron,
vinyl-dimethyl-aluminum,
vinyl-diethyl-aluminum,
vinyl-dipropyl-aluminum,
vinyl-dibutyl-aluminum,
vinyl-diamyl-aluminum,
vinyl-diphenyl-aluminum,
vinyl-dicyclohexyl-aluminum,
vinyl-methyl-ethyl-aluminum,
vinyl-ethyl-propyl aluminum,
vinyl-methyl-phenyl-aluminum,
vinyl-ethyl-cyclohexyl-aluminum,
allyl-dimethyl-aluminum,
allyl-diethyl-aluminum,
allyl-dipropyl-aluminum,
allyl-dibutyl-aluminum,
allyl-ditolyl-aluminum,
allyl-dicyclopentyl-aluminum,
isopropenyl-dimethyl-aluminum,
isopropenyl-diethyl-aluminum,
isopropenyl-dipropyl-aluminum,
isopropenyl-dibutyl-aluminum,
isopropenyl-methyl-ethyl-aluminum,
isopropenyl-ethyl-propyl-aluminum,
isopropenyl-dixylyl-aluminum,
beta-vinyl-triethyl-aluminum,
(beta-vinyl-ethyl)-dimethyl-aluminum,
(beta-vinyl-ethyl)-dipropyl-aluminum,
isobutenyl-dibutyl-aluminum,
(4-vinyl-cyclohexyl)-dimethyl-aluminum,
(4-vinyl-n-butyl)-diethyl-aluminum,
(6-vinyl-n-hexyl)-dimethyl-aluminum, etc.

Such intermediate compounds as listed in the preceding paragraph can be prepared according to well-known, standard reactions of dialkyl boron halides and dialkyl aluminum halides with appropriate Grignard reagents, such as vinyl magnesium chloride, allyl magnesium bromide, etc., or by reaction of these same halides with divinyl tin, tetravinyl lead, etc. Such reactions are illustrated as follows:

$$CH_2=CHCl + Mg \xrightarrow{\text{Tetrahydrofurane}} CH_2=CHMgCl$$

$$CH_2=CHMgCl + R_2BCl \longrightarrow CH_2=CHBR_2 + MgCl_2$$

$$CH_2=CHMgCl + R_2AlCl \longrightarrow CH_2=CHAlR_2 + MgCl_2$$

Such reactions can be represented by the following general reaction:

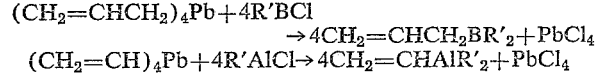

wherein R, M, R', and $m$ are as defined above.

Preparation from alkenyl tin and alkenyl lead starting compounds are also typified by the following reactions:

$$(CH_2=CH)_2Sn + 2R'_2BCl \rightarrow 2CH_2=CHBR'_2 + SnCl_2$$
$$(CH_2=CH-CH_2)_2Sn + 2R'_2AlCl$$
$$\rightarrow 2CH_2=CHCH_2AlR'_2 + SnCl_2$$
$$(CH_2=CHCH_2)_4Pb + 4R'BCl$$
$$\rightarrow 4CH_2=CHCH_2BR'_2 + PbCl_4$$
$$(CH_2=CH)_4Pb + 4R'AlCl \rightarrow 4CH_2=CHAlR'_2 + PbCl_4$$

Such intermediate compounds also can be prepared by the reaction of dialkyl boron hydrides and dialkyl aluminum hydrides, or corresponding compounds having aryl or cycloaliphatic hydrocarbon groups in place of the alkyl groups, with a considerable excess of an acetylenic or diolefinic hydrocarbon, in such a manner, for example by controlling the temperature and time of reaction, that the metal hydrides react only to the extent that there is hydrogen attached to the metal atom in the compound and that the acetylenic or diolefinic material reacts only to the extent of half of the unsaturation therein, e.g.

$$CH_2=CH-CH=CH_2 + R'_2BH \rightarrow CH_2=CHCH_2CH_2BR'_2$$
$$HC\equiv CH + R'_2BH \rightarrow CH_2=CH-BR'_2$$
$$CH_2=C=CH_2 + R'_2BH \rightarrow CH_2=CHCH_2BR'_2$$

etc. Corresponding reactions can be performed with $R'_2AlH$ to give the corresponding intermediates. These intermediates are then further reacted in accordance with the practice of this invention.

It is preferred for two reasons that the R' groups of the metal hydrides be small aliphatic groups. First, the use of smaller groups results in a higher proportion of metal in the resulting compounds. Secondly, the larger bulky groups retard somewhat the addition of the metal compounds to the unsaturated compounds, thereby necessitating more drastic reaction conditions and longer reaction periods. Therefore, methyl, ethyl, and propyl groups are preferred in place of the bulkier groups, such as phenyl, cyclohexyl, and aliphatic groups having groups attached to that carbon atom which will become attached to the metal atom, such as alpha, beta-dimethyl-propyl, etc.

The above reaction for preparation of the intermediates can be controlled by using an excess of the unsaturated material over the stoichiometric amount required (mole of hydride per mole of unsaturated compound) and by maintaining a reaction temperature which will favor reaction to the extent that there is hydrogen present in the metal compounds, which temperature should be below the temperature which will cause replacement of the hydrocarbon groups on the metal compound. This reaction also can be catalyzed by the ethers and other compounds indicated above.

However, where the ultimate compound is to contain only boron atoms and the R' groups attached to each boron atom are to be similar, the addition reacts can be performed simultaneously by using the corresponding stoichiometric amounts (2 moles of hydride per mole of hydrocarbon), or only a slight excess over the stoichiometric amount of the dialkyl metal hydride, etc., as indicated above, with the appropriate amount of acetylenic compound or the diolefinic compound. Such overall reactions using acetylene, allene, and butadiene, respectively, are illustrated as follows, although they go through the intermediate reaction indicated above:

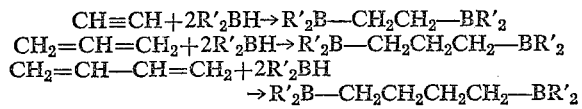

In this case, also, the temperature will be controlled as indicated to prevent replacement of the hydrocarbon groups on the metal atom. Also, in cases of mixed metal compounds and where contamination of the product with byproduct compounds in which two atoms of aluminum are contained is permissible, it is possible to add the respective boron and aluminum monohydrides directly to the acetylenic or diolefinic starting material, in which case it is preferable to use an excess of the boron compound to retard double addition of the aluminum compound. Here, also, the replacement of hydrocarbon groups from the metal compound is retarded by maintaining the reaction temperature below that temperature favoring such hydrocarbon replacement. Low temperatures also are maintained to avoid addition polymerization of the unsaturated intermediates.

By using unsaturated compounds, such as vinyl acetylene, divinyl acetylene, or other hydrocarbons having higher degrees of unsaturation, such as an aliphatic compound having three or more ethylenic groups therein, or having two or more acetylenic groups, such as diacetylene, dipropargyl, etc., additions of dialkyl metal hydrides in accordance with the practice of this invention will result in compounds in which one or more of the R groups of the first formula above will include boron or aluminum. For example, the addition of tetramethyl diborane to vinyl acetylene will result in a product having three dimethyl boron groups which is believed to have the formula:

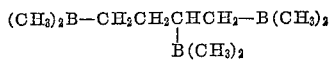

After the addition reactions have proceeded to a desired degree, excess or unreacted reagents, as well as solvents or diluents, can be removed by vaporization under reduced pressure. The application of heat for such purposes is undesirable where it will bring the temperature to the point where it might cause displacement of the hydrocarbon groups and thereby produce polymeric byproducts.

The addition reactions advantageously are conducted in the absence of moisture, or air so as to prevent decomposition of the starting materials and products. Inert atmospheres and inert diluents advantageously are used. Nitrogen, argon, gaseous hydrocarbons, such as methane, ethane, etc., are used advantageously as inert atmospheres, and saturated hydrocarbons, such as pentanes, hexanes, heptanes, cyclohexanes, and even aromatic hydrocarbons, such as benzene, toluene, etc., are used advantageously as diluents.

Typical metal compounds that can be used as starting materials in the practice of this invention include, but are not restricted to, the following: dimethyl boron hydride, diethyl boron hydride, dipropyl boron hydride, dibutyl boron hydride, diphenyl boron hydride, diphenethyl boron hydride, dicyclohexyl boron hydride, di-(cyclohexyl-ethyl)-boron hydride, dimethyl aluminum hydride, diethyl aluminum hydride, dipropyl aluminum hydride, di-(cyclohexyl-ethyl)-aluminum hydride, etc. In some cases, where such compounds are difficult to prepare or are unstable, the polymeric counterparts of such compounds which give the same addition derivatives as the monomeric materials can be used, such as, for example, tetramethyl diborane, hexamethyl triborane, tetraethyl diborane, tetramethyl dialuane, tetraethyl dialuane, etc.

The optimum temperature for effecting the addition reaction depends on a number of factors. The use of a catalyst, such as an ether compound, as listed above, permits the addition to take place at room temperature or only slightly raised temperatures. In the absence of a catalyst, higher temperatures are required. However, the use of a catalyst is preferred so as to avoid formation of byproducts which accompanies the use of higher temperatures.

The type of unsaturated group in the hydrocarbon also influences the ease of addition and, therefore, the temperature required to effect the same. For example, terminal unsaturated groups, that is vinyl, vinylidene, and propargyl groups, permit additions at lower temperatures than is the case with non-terminal ethylenic groups. Generally, in cases which require higher temperatures to effect the hydride addition, the same factors cause a corresponding increase in the temperature which will effect replacement of hydrocarbon groups from the metal atoms. Also, as a general rule, the addition of boron hydride compounds requires a lower temperature than the corresponding additions of aluminum hydride compounds. For that reason, it is generally advantageous to effect the aluminium hydride addition prior to the addition of the boron hydride, lowering the temperature after the first addition, so that the temperature used in the aluminum addition will not cause displacement of the hydrocarbon groups in the boron compound. In the aforesaid preliminary step of aluminum addition, an excess of the hydrocarbon can be used to retard any formation of dialuminum compounds. This excess of hydrocarbon can be removed prior to the boron addition by the application of reduced pressure, or, if the presence of diboron products is not objectionable, an appropriate amount of the boron compound can be used to make the mixed boron-aluminum compound and an amount of diboron compound corresponding to the excess hydrocarbon compound used.

In cases where the boron compound is to be added first, a temperature will be selected for the aluminum compound addition that is below the temperature which will effect hydrocarbon displacement from the boron atom. In such cases, longer reaction times can be used to compensate when the selected temperature is lower than is used ordinarily for such aluminum addition.

In the absence of a catalyst, the addition of the aluminum compound can be effected easily at temperatures in the range of 90–95° C. With ethers, and other types of catalysts, the addition can be effected at temperatures of 70–80° C. or even lower. Temperatures even below 50° C. can be used by using the catalyst indicated and longer reaction periods. It is preferred to keep the temperature below 100° C. to avoid displacement of the hydrocarbon groups from the aluminum.

With the boron compound, it is possible to effect the addition to the unsaturated hydrocarbon at temperatures below 40° C. and with the catalysts indicated, it is possible to effect the addition at room temperature or at even lower temperatures. In some cases temperatures above 50° C. may favor displacement of the hydrocarbon groups from the boron.

The new compounds of this invention are either liquids or solids. When it is desired to use the solid compounds of this invention in systems designed for high-energy liquid fuels, these compounds can be converted to liquids by dilution or dissolving in the simpler or lower melting compounds of this invention so as to avoid lowering the proportion of metal in the fuel compositions.

Various methods of practicing the invention are illustrated by the following examples. These examples are intended merely to illustrate the invention and not in any sense to limit the manner in which the invention can be practiced. The parts and percentages recited therein and all through this specification, unless specifically provided otherwise, refer to parts by weight and percentages by weight.

Example I

A glass reaction vessel equipped with stirrer, reflux condenser, and gas inlet, is flushed out with oxygen-free nitrogen and an atmosphere of nitrogen maintained therein. There is then added a solution of 100 parts of diethyl ether and 68 parts of vinyl dimethyl borane (prepared from dimethyl boron chloride and tetravinyl tin according to paper 69, page 26M, Abstract of Papers, 135th meeting American Chemical Society, April 5, 1959), and the mixture is cooled to 10° C. Tetramethyl diborane gas is fed into the reaction mixture at a rate such that 42.5 parts are absorbed over a period of approximately one hour. After the absorption is completed, the reaction mass is allowed to come to room temperature and the stirring continued for one hour. The reaction product is then distilled to remove the ether, and the 1,2-bis-(dimethylboron)-ethane isolated by distillation in the boiling range of 30–63° C. at 0.1 to 2 mm.

The product upon analysis shows 19.48 percent boron, which checks with the 19.73 percent theoretical for 1,2-bis(dimethyl boron)-ethane. Methane and ethane are given off upon decomposition with water.

The above procedure is repeated using vinyl dimethyl borane prepared in situ without isolation and reacted in situ by the addition of ether and tetramethyl diborane to give the same product.

Example II

A glass reaction vessel equipped with stirrer, reflux condenser, and gas inlet, is flushed out with oxygen-free nitrogen and an atmosphere of nitrogen maintained therein. A solution of 100 parts of diethyl ether and 84 parts of tetramethyl diborane is added to the reaction vessel and cooled to 0° C. Acetylene gas is fed into the reaction mixture at a rate such that 26 parts of acetylene are absorbed over a period of approximately an hour. After the absorption is completed, the reaction mass is allowed to come to room temperature and stirring continued for another half hour. The greater part of the ether solvent is removed by distillation, the reaction mass temperature being maintained at no more than 40° C. Then, while the nitrogen atmosphere is still maintained on the system, the reaction product is transferred to distillation equipment provided with means for effecting distillation at reduced pressures. The pressure is reduced gradually to effect removal of the last traces of ether and unreacted reagents. The product obtained upon distillation at reduced pressure is identical to that of Example I.

Example III

The procedure of Example I is repeated using an equivalent amount of dibutyl borane in place of the tetramethyl diborane. The product after isolation is identified as 1-(dibutyl boron)-2-(dimethyl boron)-ethane.

Example IV

The procedure of Example I is repeated using allyl dibutyl borane in an equivalent amount in place of the vinyl dimethyl borane. The product after isolation is identified as (dibutyl boron)-(dimethyl boron)-propane.

Example V

Pressure reaction equipment is set up and swept out with oxygen-free nitrogen. One hundred parts of hexane are introduced into the reaction vessel, cooled to 0° C., and then acetylene gas is passed into the hexane until it is saturated with acetylene and an atmosphere of acetylene is maintained at a pressure of approximately 5 inches of mineral oil, passing in more acetylene whenever the pressure drops below this point. The reaction mixture is maintained at a temperature of approximately 0° C., while a solution of 50 parts of diethyl ether and 42 parts of tetramethyl diborane is added dropwise to the reaction mixture over a period of one hour. After all of the ether solution has been added, the reaction mass is allowed to come to room temperature over a period of about one-half hour and stirring is then continued for another half hour. Unreacted acetylene is allowed to escape by releasing the pressure and sweeping the free space of the reaction vessel with oxygen-free nitrogen.

Then a solution of 86 parts of diethyl aluminum hydride in 50 parts of diethyl ether is added gradually over a period of one hour. After all of the ether solution has been added, the temperature is raised gradually and the ether is allowed to reflux for one-half hour. Next the ether is removed by distillation while maintaining the temperature of the reaction mass at approximately 40° C. After the ether vaporization has slowed down, the pressure is reduced gradually to remove the last traces of ether and to remove the hexane solvent, as well as any unreacted reagent.

The product upon analysis shows 7.03 percent of boron and 17.36 percent of aluminum, which values check closely with the corresponding theoretical values for 1-(dimethyl-boron)-2-(diethyl-aluminum)-ethane. Methane and ethane are given off upon decomposition of the product with water.

Upon repetition of the foregoing procedure, using 70 parts of tetraethyl diborane in place of the diethyl aluminum hydride, the corresponding diboron compound is obtained.

Example VI

The procedure of Example II is repeated using 40 parts of allene, in place of the acetylene. The product distills at 35°–70° C. at 0.1–2 mm. and shows a boron content, upon ultimate analysis, of 17.49 percent, which checks closely with the theoretical value for 1,3-bis-(dimethyl boron)-propane. Methane and propane are given off upon decomposition of the product with water.

Example VII

A solution of 140 parts of 4-(diethyl aluminum)-butene-1 (prepared according to Example 8 of Ziegler Patent No. 2,826,598) in 200 parts of diethyl ether is placed under nitrogen atmosphere, in a reaction flask, equipped with stirrer, and a solution of 42 parts of tetramethyl diborane in 50 parts of diethyl ether is added gradually over a period of one hour. After the addition of the ether solution is completed, the stirring is continued for an additional two hours. Then, the temperature is raised gradually and the ether allowed to reflux for one-half hour, following which the ether is removed by distillation while maintaining the temperature of the reaction mass at approximately 40° C. After ether vaporization has slowed down, the pressure is reduced gradually to remove the last traces of ether and eventually to remove any unreacted reagent and distillation of the product is effected as in Example I. Ultimate analysis of the distilled product shows 6.02 percent boron and 14.82 percent aluminum, which values check closely with the theoretical values for 1-(dimethyl boron)-4-(diethyl aluminum)-butane. Decomposition of the product with water gives methane, ethane and butane.

Example VIII

A solution of 84 parts of tetramethyl diborane in 50 parts of diglyme is maintained at room temperature, under an atmosphere of nitrogen, and in a state of agitation, while butadiene is fed into the solution until approximately 54 parts of butadiene have been absorbed. The agitation then is continued for an additional hour, following which the pressure is reduced gradually to remove solvent and unreacted reagent, and subsequently to recover the product. Ultimate analysis of the distilled product shows 15.74 percent boron, which checks closely with the theoretical value for boron in 1,4-bis-(dimethyl boron)-butane.

Repetition of the foregoing procedure with 2-phenyl butadiene in place of the butadiene gives a product whose ultimate analysis shows 10.13 percent boron, which value checks closely with the theoretical value for 1,4-bis-(dimethyl boron)-2-phenyl-butane.

*Example IX*

The procedure of Example VII is repeated using an equivalent amount of vinyl diethyl aluminum (prepared from vinyl magnesium chloride and diethyl aluminum chloride) in place of the diethyl aluminum butene. The product is identified as 1-(dimethyl boron)-2-(diethyl aluminum)-ethane.

*Example X*

The procedure of Example V is repeated, except that the oil pressure is not used and an equivalent amount of isoprene is used in place of the acetylene, all of it being added at the start. Ultimate analyses of the distilled product gives values of 5.54 percent boron and 13.77 percent aluminum, which values check closely with the theoretical values for methyl-(dimethyl boron)-(diethyl aluminum)-n-butane.

*Example XI*

The procedure of Example II is repeated except that vinyl acetylene is used instead of acetylene, and the absorption is continued until 35 parts of vinyl acetylene (approximately two-thirds of a mole) is absorbed. Ultimate analysis of the distilled product shows a boron content of 18.06 percent, which agrees with the theoretical value for tris-(dimethyl boron)-butane.

*Example XII*

The procedure of Example V is repeated except: vinyl acetylene is used in place of acetylene; the first solution added is 50 parts of diethyl ether and 58 parts of tetramethyl dialuane instead of the tetramethyl diborane; just before the second solution is added, the ether is refluxed for approximately one-half hour, then the temperature is reduced to room temperature; and the second ether solution added is made up of 50 parts of diethyl ether and 84 parts of tetramethyl diborane instead of the diethyl aluminum hydride. Ultimate analyses of the distilled product shows a boron content of 11.21 percent and an aluminum content of 13.95 percent, which values check closely with the theoretical values for (dimethyl aluminum)-bis-(dimethyl boron)-butane.

When Example XI is repeated using an equivalent amount of divinyl acetylene in place of the vinyl acetylene, an even larger number of dimethyl boron groups are present in the resulting product. From the analysis a mixture is indicated having three and four such groups present.

Using the procedure of the foregoing examples, or appropriate modifications thereof with appropriate unsaturated compounds and appropriate hydrocarbon substituted metal compounds, the following compounds typical of the compounds of this invention are prepared:

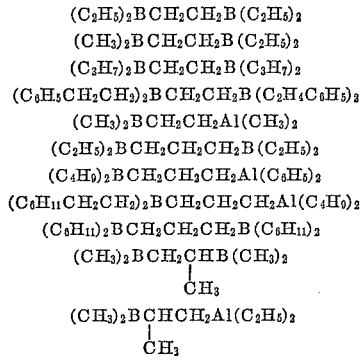

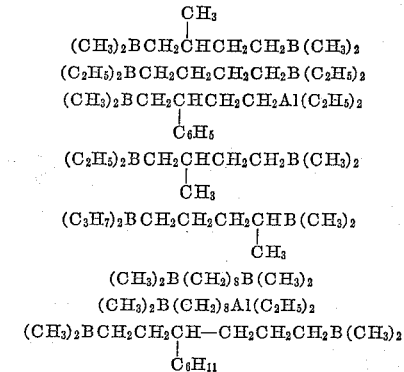

As indicated above, the compounds of this invention are particularly useful as high-energy fuels. The liquid products of this invention can be used as such in rocket and missile systems as presently designed for use of liquid fuels. The solid products of this invention can be dissolved in the simplier liquid compounds of this invention so as to give liquid compositions suitable for use in liquid fuel systems, and thereby do not suffer a decrease in energy content by virtue of the solvent used. These compounds can be used, also, for various other purposes, such as additives to improve the characteristics of conventional motor fuels, such as gasoline, jet engine fuels, etc. The methods of using these materials for such purposes employ the conventional methods now used.

While certain features of this invention have been described in detail with respect to various embodiment thereof, it will, of course, be apparent that other modifications may be made within the spirit and scope of this invention and it is not intended to limit the invention to the exact details shown above except insofar as they are defined in the following claims.

The invention claimed is:
1. 1,4-bis-(dimethyl-boron)-butane.
2. 1-(dimethyl-boron)-2-(dimethyl-aluminum)-ethane.
3. 1 - (dimethyl - boron) - 3 - (dimethyl - aluminum) - propane.
4. 1-(dimethyl-boron)-4-(dimethyl-aluminum)-butane.
5. 1,2,4-tris-(dimethyl-boron)-butane.
6. (Dimethyl - aluminum) - bis - (dimethyl - boron)-n-butane.
7. 1,4-bis-(dimethyl-boron)-butane.
8. A chemical compound having the formula $R'_2B$—$CR_2$—$(CR_2)_m$—$AlR'_2$ wherein R is a radical selected from the class consisting of hydrogen and alkyl, cycloalkyl and aryl hydrocarbon groups having no more than 8 carbon atoms, and alkyl, cycloalkyl and aryl hydrocarbon groups having no more than 8 carbon atoms and having an $MR'_2$ group substituted thereon, M is an element selected from the class consisting of boron and aluminum, R' is a hydrocarbon group selected from the class consisting of alkyl, cycloalkyl and aryl groups of no more than 8 carbon atoms and m is an integer having a value of at least 1 and no more than 8.
9. A process for the preparation of a boron-hydrocarbon compound having at least two —$BR'_2$ groups therein and no more than 9 carbon atoms in the linear chain thereof, wherein R' is a hydrocarbon group selected from the class consisting of alkyl, cycloalkyl and aryl groups of no more than 8 carbon atoms, comprising the step of reacting an unsaturated compound selected from the class consisting of aliphatic hydrocarbons having a terminal acetylenic group as the only unsaturated group therein and aliphatic hydrocarbons having a plurality of groups therein selected from the class consisting of vinyl, vinylidene and terminal acetylenic groups, said unsaturated aliphatic hydrocarbons each having no more than 9 carbon atoms in the linear chain thereof, with a boron compound having one hydrogen and two R' hydrocarbon groups attached to each boron atom therein, said hydrocarbon groups attached to said boron atoms each having no more than 8 carbon atoms therein, said compounds being reacted in the proportion of at least two equivalents of said boron compound per mole of said unsaturated hydrocarbon compound reacted therewith.

10. A process of claim 9, in which said boron compound is tetramethyl diborane, and said unsaturated hydrocarbon is acetylene.

11. A process of claim 9, in which said boron compound is tetramethyl diborane, and said unsaturated compound is allene.

12. A process of claim 9, in which said boron compound is tetramethyl diborane, and said unsaturated compound is butadiene.

13. A process of claim 9, in which said boron compound is tetramethyl diborane, and said unsaturated compound is vinyl acetylene.

14. A process for the preparation of a compound having the formula $R'_2B—CR_2(CR_2)_m—MR'_2$ comprising the step of reacting a compound selected from the class consisting of a compound having the formula $R'_2MH$ and polymers thereof with a compound having the formula $CR_2=CR—(CR_2)_mMR'_2$ in which formulas R represents a radical selected from the class consisting of hydrogen, alkyl, cycloalkyl and aryl groups having no more than 8 carbon atoms, and alkyl, cycloalkyl and aryl groups having no more than 8 carbon atoms and having an $MR'_2$ group substituted thereon, M is an element selected from the class consisting of boron and aluminum, at least one of said M atoms being boron, R' is a hydrocarbon group selected from the group consisting of alkyl, cycloalkyl and aryl groups of no more than 8 carbon atoms. $m$ is an iinteger having a value of at least one and no more than 8, at a temperature which effects such reaction without substantial displacement of said R' groups, said reaction being catalyzed by a compound having a formula selected from the group consisting of $B(OR'')_3$ and $Al(OR'')_3$ in which at least one R'' is a monovalent hydrocarbon group selected from the class consisting of alkyl, cycloalkyl and aryl groups and the remaining R'' groups are selected from the class of hydrogen and said monovalent hydrocarbon groups.

References Cited in the file of this patent

UNITED STATES PATENTS

| | | |
|---|---|---|
| 2,925,437 | Brown | Feb. 16, 1960 |
| 3,066,170 | Ramsden | Nov. 27, 1962 |
| 3,072,699 | Ramsden | Jan. 8, 1963 |

OTHER REFERENCES

Urry et al.: J. Am. Chem. Soc. 76, 299-301 (1954), cited in C. A. 49 (12275A).

Ceron et al.: J. Am. Chem. Soc. vol. 81, pp. 6368 to 6371.

Brown: J. Organic Chem., vol. 22, pages 1736-8 (1957).